United States Patent [19]
Mölter et al.

[11] 3,941,337
[45] Mar. 2, 1976

[54] AIRPLANE STAIRWAY

[75] Inventors: Gunther Mölter, Ottobrunn; Gerd Cerne, Bremen, both of Germany

[73] Assignee: Messerschmitt-Bolkow-Blohm GmbH, Munich, Germany

[22] Filed: Mar. 13, 1974

[21] Appl. No.: 450,611

[30] Foreign Application Priority Data
Mar. 17, 1973 Germany............................ 2313319

[52] U.S. Cl. .......................... 244/129 S; 244/137 P
[51] Int. Cl.² ............................................ B64C 1/24
[58] Field of Search ......... 244/129 S, 137 R, 137 P, 244/118 P; 182/12, 36, 39, 82, 88, 93, 127; 105/443, 447, 449; 280/163, 166

[56] References Cited
UNITED STATES PATENTS

| | | | |
|---|---|---|---|
| 2,933,149 | 4/1960 | Lee............................. | 244/129 S X |
| 2,990,148 | 6/1961 | James........................... | 244/129 S |
| 3,051,419 | 8/1962 | Weiland et al.................. | 244/137 R |
| 3,357,372 | 12/1967 | Bader.......................... | 244/137 R X |
| 3,799,479 | 3/1974 | Roeder et al. .................. | 244/137 R |

FOREIGN PATENTS OR APPLICATIONS
833,730    4/1960    United Kingdom ............. 244/129 S

*Primary Examiner*—Trygve M. Blix
*Assistant Examiner*—Barry L. Kelmachter
*Attorney, Agent, or Firm*—Woodhams, Blanchard and Flynn

[57] ABSTRACT

A stairway for aircraft which will fold into a compact package. The stairway is mounted on suitable tracks within the aircraft for alternate positioning, either in alignment with a door thereof for extension therethrough or for movement as a compact package to one side thereof. Such track may be either a standard seat track or a special track provided for the purpose. Translation mechanism such as a sprocket supported chain or a parallelogram arranged linkage may be provided for moving such package translatably and without rotation thereof between a position in front of the aircraft door and a position at one side thereof.

8 Claims, 3 Drawing Figures

AIRPLANE STAIRWAY

FIELD OF THE INVENTION

The invention relates to an airplane stairway which consists of several sections which can be folded to form a package, and which are connected by alternately arranged hinged joints.

BACKGROUND OF THE INVENTION

Such stairways are known in many type of constructions. They are in general adjusted individually to the respective type of aircraft and are structually integrated with same. Differently expressed, this means that known passenger planes in many cases have their own stairway or stairs which can be transferred only limitedly from one airplane to another. Since stairways of this construction are fixedly connected to the respective aircraft, they cannot be removed on short notice for use with other aircraft.

This has various disadvantages; in particular the lack of exchangeability is an increasing disadvantage because modern passenger aircraft are increasingly constructed to be readily and quickly convertible as desired from the passenger version to the freight version, and vice versa. In this connection it is of a special disadvantage if the stairway is fixed to the airplane.

A further disadvantage of the known airplane stairways consists in that these are at times constructed as under-floor stairs or form a single structural unit with the respective aircraft door. The first one of these two arrangements often represents an obstacle in the freight room which in almost all passenger craft is arranged below the cabin floor. Further, during installation of an under-floor stairway, in addition to extensive structural reinforcements, additional sealing measures must be taken. The second one of the above-mentioned arrangements, namely, having the steps integrated with the aircraft door, has the disadvantage that during an emergency evacuation that particular door cannot be used as an emergency exit.

The basic purpose of the invention is to avoid these disadvantages and to provide an autonomous airplane stairway which can be used as a basic unit for all passenger airplanes. Such purpose is substantially attained by causing, in the case of an airplane stairway of the type described above, the stairway section which is to be connected to the airplane to be secured for easy release on the cabin floor in the zone of the airplane entrance in such a manner that the stairway can be stored in folded condition within the airplane alongside the entrance thereof.

The inventive airplane stairway must thus be understood as an independent piece of standard equipment which can be used as a separate unit for each passenger airplane. Because of the seats which are to be secured on the cabin floor, the structure of the floor in the zone of the airplane door is already sufficiently reinforced that additional reinforcing measures for the stairway are generally not required. Furthermore the herein proposed equipment for an airplane stairway has the advantage that it needs to be carried along in the airplane only when airports without suitable ground entry and exit possibilities are involved.

In view of the free accessibility of the door during the flight, which is required for safety reasons, it is advantageous to arrange the proposed stairway laterally movable and lockable on tracks which extend transversely to the entry direction on the cabin floor. The tracks for the seats which are already present may be used within the scope of the invention as securement tracks. In view of the forces which are transmitted from the seat onto the aircraft structure, said tracks are already so constructed that they need not be additionally reinforced for receiving the inventive stairway instead of, for example, two to four seats. However, in such cases that the seat tracks cannot be used as tracks or as holding elements for the stairway of the invention, the invention provides further that between the stairway and the seat tracks suitable track pieces are arranged which can be secured on the seat tracks. It is in this connection understood that these track pieces are constructed in view of possible emergencies in such a manner that they can be tilted up laterally besides the door during the flight.

According to a further possibility of securing the stairway in the airplane which lies within the scope of the invention, it is provided that the stairway is secured through rotatably supported arms on the cabin floor, which make it possible to store the stairway package during flight beside the door so that same is freely accessible for emergency cases.

The stairway system of the invention has also advantages in that the airplane does not absolutely need to carry the stairway along in its freight version; it is sufficient to store at the airports in question some stairways according to the invention which, if needed, are available for the passenger versions. A further advantage of the proposed stairway is not the least in that through its use there will be on the whole substantial weight savings as compared with common stairways; compared with an under-floor stairway, it is for example over 30percent.

Further advantages and details of the airplane stairway of the invention can be taken from the drawings and the following description of the drawings.

DETAILED DESCRIPTION

Figure 1:
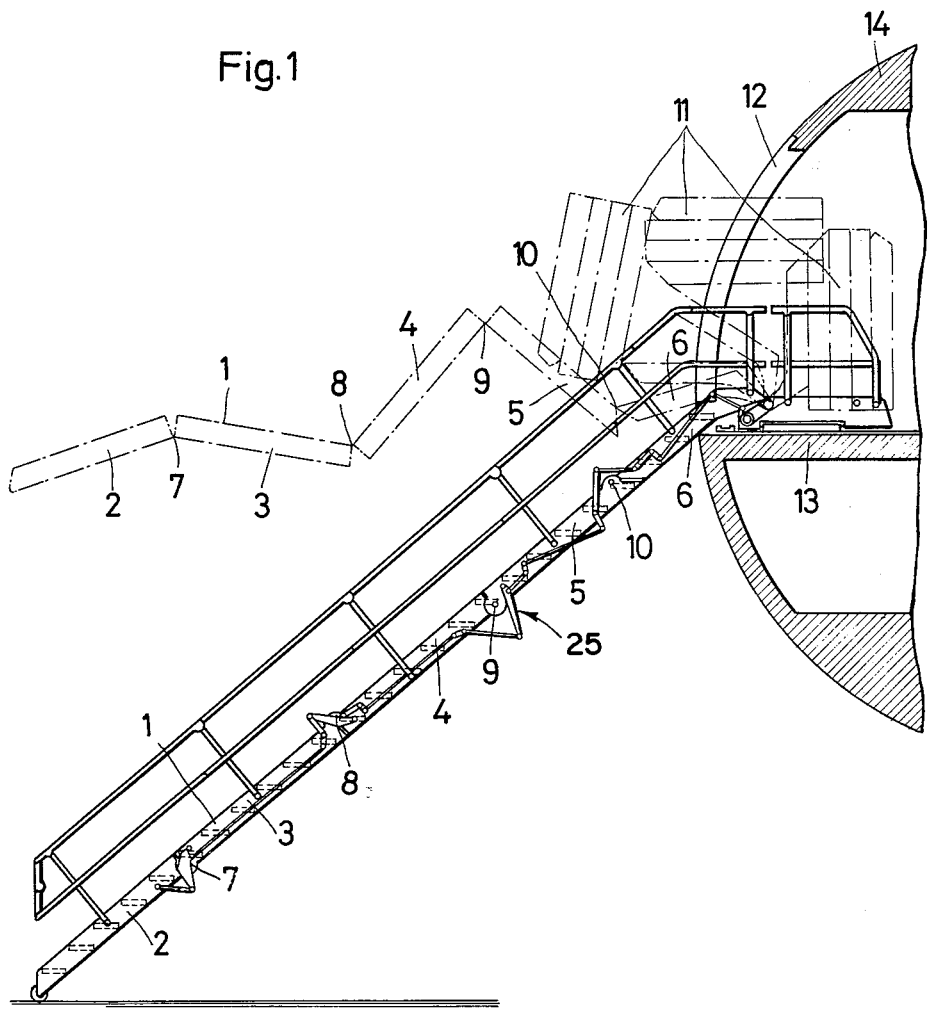
FIG. 1 is a side view of the proposed airplane stairway which is arranged in various positions in or on an aircraft fuselage.
Figure 2:
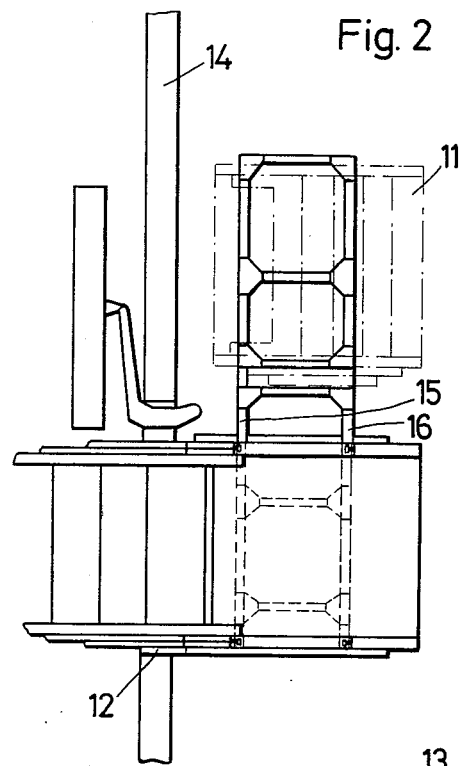
FIG. 2 is a top view of a section according to FIG. 1, within the fuselage.

The stairway 1 of the invention according to FIG. 1 consists in a conventional manner of several, in this case five, individual sections 2 to 6 which are connected by alternately arranged hinged joints 7 to 10. This permits in the illustrated example an accordion-like folding of the stairway 1 through connected drive linkages 25, the accordian-like folding corresponding to the type and manner which is indicated in the upper part of FIG. 1 by dash-dotted lines. The result of this folding is a compact package 11, the section 6 of which can be secured in an easily releasable manner on the cabin floor 13 in the zone of the aircraft entrance 12. As can be seen from FIG. 2, the stairway package 11 is arranged on tracks 15 and 16 which extend transversely to the direction of entrance into the airplane. Said tracks can be fixed to the floor or movable and extend longitudinally of the aircraft across the entire width of the entrance 12 and sufficiently beyond said entrance that the stairway 11 including the tracks 15, 16 can be stored as a package 11 during the flight at one side of the entrance 12.

Figure 3:
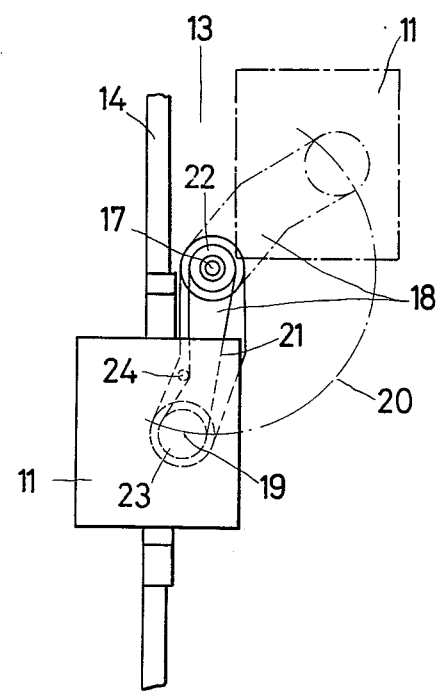
FIG. 3 is a modified embodiment of the securement and the storability of the airplane stairway according to the invention.

A further possibility for securing and storing the stairway package 11 within the airplane fuselage is schematically indicated in FIG. 3. One arm 18 is hinged rotatably at point 17 on the cabin floor 13 of the airplane fuselage 14, so that the arm 18 is supported rotatably about the point 17 above the floor 13. At the other, free end of the arm 18, the proposed stairway package 11 is secured so that it can be brought from the operating or in-use position directly into a position according to the dash-dotted lines of FIG. 3 in the zone of the entrance 12 for storage during the flight. The point 19 thus moves on the curve 20 of FIG. 3, which curve is indicated by a dash-dotted line. If it is preferred to move the stairway package 11 only translatably on a curved path, in this case on the path 20, this can be assured by an endless chain 21. The chain 21 is guided over chain wheels 22 and 23 which are arranged centrally symmetrically in the points 17 and 19 and can, if desired, be maintained in a tensioned condition by a tensioning idler 24.

The same result is achieved if the stairway package 11 is supported on the cabin floor 13 by means of levers arranged as a parallelogram. Also in this case the package 11 maintains its positions indicated in FIG. 3, namely during movement on the path 20 it does not carry out rotary movements, which can be advantageous for reasons of saving space.

Although particular preferred embodiments of the invention have been disclosed above for illustrative purposes, it will be understood that variations or modifications thereof which lie within the scope of the appended claims are fully contemplated.

The embodiments of the invention in which an exclusive property or privilege is claimed are defined as follows:

1. An on-board collapsible stairway and a stairway storage installation, for disposition transversely of an aircraft passenger cabin structure on an aircraft having a door opening thereinto, comprising:
   track means mounted on the floor of said aircraft passenger cabin structure and extending in a direction parallel to the longitudinal axis of said aircraft and terminating in front of said door opening;
   a collapsed stairway package means mounted on said track means for movement therealong between positions in front of said door and longitudinally spaced along side thereof in a direction parallel to the longitudinal axis of said aircraft, said collapsed stairway package means including collapsible stairway means comprising a plurality of elongated and straight sections stacked side-by-side in said package means, alternate hinge means connecting said plurality of said sections serially together, said alternate hinge means comprising a first plurality of hinges connecting alternate ones of mutually adjacent one ends of said sections and a second plurality of hinges connecting alternate ones of the mutually adjacent other ends of said sections not connected together by said first plurality of hinges; and
   drive means for moving said collapsible stairway means from a collapsed position wherein said first and second sections are side-by-side and parallel to a fully extended position wherein said first and second sections are positioned end-to-end and extend out of said door down to ground level.

2. The on-board collapsible stairway installation according to claim 1, wherein said track means are movable between positions in front of said door and to one side thereof parallel to the longitudinal axis of said aircraft.

3. The on-board collapsible stairway installation according to claim 1, wherein said first and second sections are stored in the collapsed position in said aircraft cabin so that the longitudinal axes of each of said sections is vertically aligned and the axes of said first and second plurality of hinges extend horizontally.

4. An on-board collapsible stairway and stairway storage installation, for disposition transversely of an aircraft passenger compartment on an aircraft having a door opening thereinto, comprising:
   track means mounted on the floor within said aircraft passenger compartment and extending in a direction parallel to the longitudinal axis of said aircraft and terminating in front of said door opening;
   a collapsed stairway package means mounted on said track means for movement therealong between positions in front of said door and longitudinally spaced along side thereof in a direction parallel to the longitudinal axis of said aircraft, said collapsed stairway package means including a collapsible stairway means; and
   drive means for moving said collapsible stairway means between a collapsed position and a fully extended position extending out of said door down to ground level.

5. An on-board collapsible stairway and stairway storage installation, for disposition transversely of an aircraft passenger compartment on an aircraft having a door opening thereinto, comprising:
   guide means mounted inside said aircraft passenger compartment adjacent said door opening;
   a collapsed stairway package means mounted on said guide means for movement between positions in front of said door and longitudinally spaced along side thereof in a direction parallel to the longitudinal axis of said aircraft, said collapsed stairway package means including collapsible stairway means; and
   drive means for moving said collapsible stairway means between a collapsed position and a fully extended position extending out of said door down to ground level.

6. The on-board collapsible stairway installation according to claim 5, wherein said guide means is comprised of track means mounted on the floor of said aircraft passenger compartment and extending in a direction parallel to the longitudinal axis of said aircraft and terminating in front of said door opening.

7. The on-board collapsible stairway installation according to claim 5, wherein said guide means is comprised of pivot means secured to the floor of said aircraft passenger compartment and means defining a rotatably supported arm on said pivot means; and
   wherein said collapsed stairway package means is mounted on said rotatably supported arm.

8. The on-board collapsible stairway installation according to claim 7, wherein said collapsed stairway package means and said rotatably supported arm include endless band means and support means therefor for effecting, during a translatory movement of said collapsed stairway package means with said rotatably supported arm, a simultaneous rotation of said collapsed stairway package means about an axis extending therethrough parallel to the axis of said pivot means so that said collapsible stairway means remains in a fixed oriented relationship relative to said door of said aircraft passenger compartment during said translatory movement.

* * * * *